US010404747B1

(12) United States Patent
Sela et al.

(10) Patent No.: US 10,404,747 B1
(45) Date of Patent: Sep. 3, 2019

(54) DETECTING MALICIOUS ACTIVITY BY USING ENDEMIC NETWORK HOSTS AS DECOYS

(71) Applicant: ILLUSIVE NETWORKS LTD., Tel Aviv (IL)

(72) Inventors: Tom Sela, Holon (IL); Magal Baz, Ramat Hasharon (IL)

(73) Assignee: ILLUSIVE NETWORKS LTD., Tel Aviv (IL)

( * ) Notice: Subject to any disclaimer, the term of this patent is extended or adjusted under 35 U.S.C. 154(b) by 0 days.

(21) Appl. No.: 16/044,477

(22) Filed: Jul. 24, 2018

(51) Int. Cl.
*H04L 29/06* (2006.01)

(52) U.S. Cl.
CPC ...... *H04L 63/1491* (2013.01); *H04L 63/0281* (2013.01)

(58) Field of Classification Search
CPC ............. H04L 63/1491; H04L 63/0281; H04L 63/1416
USPC ........................................................... 726/23
See application file for complete search history.

(56) References Cited

U.S. PATENT DOCUMENTS

| | | | | |
|---|---|---|---|---|
| 5,938,745 | A * | 8/1999 | Boyle | G06F 13/14 379/93.01 |
| 6,363,489 | B1 | 3/2002 | Comay et al. | |
| 6,618,709 | B1 | 9/2003 | Sneeringer | |
| 6,836,888 | B1 * | 12/2004 | Basu | G06F 21/57 713/164 |
| 7,058,974 | B1 * | 6/2006 | Maher, III | H04L 47/22 370/229 |
| 7,065,657 | B1 | 6/2006 | Moran | |

(Continued)

FOREIGN PATENT DOCUMENTS

| | | |
|---|---|---|
| WO | 2006131124 A1 | 12/2006 |
| WO | 2015001969 A1 | 1/2015 |

(Continued)

OTHER PUBLICATIONS

Dongxia, Liu, and Zhang Yongbo. "An intrusion detection system based on honeypot technology." In Computer Science and Electronics Engineering (ICCSEE), 2012 International Conference on, vol. 1, pp. 451-454. IEEE, 2012. (Year: 2012).*

(Continued)

*Primary Examiner* — Luu T Pham
*Assistant Examiner* — Walter J Malinowski
(74) *Attorney, Agent, or Firm* — Soquel Group I.P Ltd.

(57) ABSTRACT

A system for detecting malicious activity in networks, including a deception manager having administrative credentials for a network, planting deceptions within network hosts, and distributing a decoy agent to each endemic decoy host (EDH), each deception including information regarding decoy communication ports of an EDH, each EDH having a group of ports, referred to as decoy ports, for connection by an attacker from a network host that the attacker has breached, wherein each decoy agent is programmed to alert the deception management server, and to proxy communication with the attacker to a trap server, in response to the decoy agent identifying the attacker attempting a connection to the decoy agent's EDH via one of the decoy ports, and a forensic collector that collects, from the breached network host, forensics of the attacker's activity, when the decoy agent acts as a proxy between the attacker and the trap server.

10 Claims, 12 Drawing Sheets

(56) References Cited

U.S. PATENT DOCUMENTS 7,089,589 B2 8/2006 Chefalas et al.
7,093,291 B2 8/2006 Bailey
7,516,227 B2 4/2009 Cohen
7,574,741 B2 8/2009 Aviani et al.
7,636,944 B2 12/2009 Raikar
7,665,134 B1 2/2010 Hernacki et al.
7,694,339 B2 4/2010 Blake et al.
7,725,937 B1 5/2010 Levy
7,752,664 B1 7/2010 Satish et al.
7,945,953 B1 5/2011 Salinas et al.
8,015,284 B1 9/2011 Isenberg et al.
8,151,348 B1 * 4/2012 Day .................... H04L 63/1408 709/224
8,181,249 B2 5/2012 Chow et al.
8,181,250 B2 5/2012 Rafalovich et al.
8,250,654 B1 8/2012 Kennedy et al.
8,375,447 B2 2/2013 Amoroso et al.
8,499,348 B1 7/2013 Rubin
8,528,091 B2 9/2013 Bowen et al.
8,549,642 B2 10/2013 Lee
8,549,643 B1 * 10/2013 Shou ..................... G06F 21/556 455/410
8,613,094 B1 * 12/2013 Falliere ................... G06F 21/57 726/22
8,719,938 B2 5/2014 Chasko et al.
8,739,281 B2 5/2014 Wang et al.
8,739,284 B1 5/2014 Gardner
8,769,684 B2 7/2014 Stolfo et al.
8,819,825 B2 8/2014 Keromytis et al.
8,856,928 B1 10/2014 Rivner et al.
8,881,288 B1 11/2014 Levy et al.
8,925,080 B2 12/2014 Hebert
9,009,829 B2 4/2015 Stolfo et al.
9,043,905 B1 5/2015 Allen et al.
9,124,622 B1 9/2015 Falkowitz et al.
9,152,808 B1 10/2015 Ramalingam et al.
9,240,976 B1 1/2016 Murchison
9,325,728 B1 4/2016 Kennedy et al.
9,350,758 B1 * 5/2016 Aharoni ................ G06F 21/577
9,356,942 B1 5/2016 Joffe
9,386,030 B2 7/2016 Vashist et al.
9,418,222 B1 * 8/2016 Rivera .................. G06F 21/554
9,495,188 B1 11/2016 Ettema et al.
9,756,075 B1 * 9/2017 Gopalakrishna .... H04L 63/1491
10,044,675 B1 * 8/2018 Ettema ................ H04L 63/0227
2002/0066034 A1 5/2002 Schlossberg et al.
2002/0194489 A1 12/2002 Almogy et al.
2003/0084349 A1 5/2003 Friedrichs et al.
2003/0110396 A1 6/2003 Lewis et al.
2003/0145224 A1 7/2003 Bailey
2004/0088581 A1 5/2004 Brawn et al.
2004/0128543 A1 7/2004 Blake et al.
2004/0148521 A1 7/2004 Cohen et al.
2004/0160903 A1 8/2004 Gai et al.
2004/0172557 A1 9/2004 Nakae et al.
2004/0255155 A1 12/2004 Stading
2005/0114711 A1 5/2005 Hesselink et al.
2005/0132206 A1 6/2005 Palliyil et al.
2005/0149480 A1 7/2005 Deshpande
2005/0204157 A1 * 9/2005 Johnson .............. H04L 63/1491 726/22
2005/0235360 A1 10/2005 Pearson
2005/0249123 A1 * 11/2005 Finn ................... H04L 41/0677 370/242
2006/0010493 A1 1/2006 Piesco et al.
2006/0041761 A1 2/2006 Neumann et al.
2006/0069697 A1 3/2006 Shraim et al.
2006/0101516 A1 5/2006 Sudaharan et al.
2006/0161445 A1 * 7/2006 Frank ...................... G06F 21/10 726/17
2006/0161982 A1 7/2006 Chari et al.
2006/0224677 A1 10/2006 Ishikawa et al.
2006/0242701 A1 10/2006 Black et al.
2007/0028301 A1 2/2007 Shull et al.
2007/0039038 A1 2/2007 Goodman et al.
2007/0043876 A1 * 2/2007 Varga ................ H04L 29/06027 709/245
2007/0157315 A1 7/2007 Moran
2007/0192853 A1 8/2007 Shraim et al.
2007/0226796 A1 9/2007 Gilbert et al.
2007/0271614 A1 * 11/2007 Capalik ............... H04L 63/1441 726/23
2007/0299777 A1 12/2007 Shraim et al.
2008/0016570 A1 * 1/2008 Capalik ............... H04L 63/1408 726/23
2008/0086773 A1 4/2008 Tuvell et al.
2008/0098107 A1 * 4/2008 Jones ...................... H04L 63/12 709/224
2008/0126617 A1 * 5/2008 Brownlow ............ G06F 9/4812 710/48
2008/0155693 A1 6/2008 Mikan et al.
2008/0181393 A1 * 7/2008 Brost ...................... H04L 12/66 379/413
2009/0019547 A1 1/2009 Palliyil et al.
2009/0049546 A1 * 2/2009 Verma ................. H04L 43/0817 726/22
2009/0144827 A1 6/2009 Peinado et al.
2009/0222920 A1 9/2009 Chow et al.
2009/0241173 A1 9/2009 Troyansky
2009/0241191 A1 9/2009 Keromytis et al.
2009/0241196 A1 9/2009 Troyansky et al.
2009/0328216 A1 * 12/2009 Rafalovich ......... H04L 43/0876 726/23
2010/0058456 A1 3/2010 Jajodia et al.
2010/0071051 A1 3/2010 Choyi et al.
2010/0077483 A1 3/2010 Stolfo et al.
2010/0082513 A1 4/2010 Liu
2010/0250509 A1 * 9/2010 Andersen ............... G06Q 10/10 707/705
2010/0251369 A1 9/2010 Grant
2010/0269175 A1 10/2010 Stolfo et al.
2010/0313265 A1 * 12/2010 Lin ................... H04L 29/12915 726/22
2011/0016527 A1 1/2011 Yanovsky et al.
2011/0080842 A1 * 4/2011 Zheng ................. H04L 12/2863 370/252
2011/0154494 A1 6/2011 Sundaram et al.
2011/0167494 A1 * 7/2011 Bowen .................. G06F 21/566 726/24
2011/0214182 A1 9/2011 Adams et al.
2011/0258705 A1 10/2011 Vestergaard et al.
2011/0268121 A1 * 11/2011 Karino ................ H04L 12/4633 370/392
2011/0302653 A1 12/2011 Frantz et al.
2011/0307705 A1 12/2011 Fielder
2012/0005756 A1 1/2012 Hoefelmeyer et al.
2012/0030041 A1 * 2/2012 Wolosewicz ....... G06Q 30/0277 705/14.73
2012/0084866 A1 4/2012 Stolfo
2012/0167208 A1 6/2012 Buford et al.
2012/0174224 A1 * 7/2012 Thomas ................ G06F 21/566 726/24
2012/0210388 A1 8/2012 Kolishchak
2012/0246724 A1 9/2012 Sheymov et al.
2012/0254333 A1 * 10/2012 Chandramouli ........ G06F 17/27 709/206
2012/0297341 A1 * 11/2012 Glazer ...................... G06F 8/30 715/810
2012/0311691 A1 * 12/2012 Karlin ................. H04L 63/0236 726/12
2012/0311703 A1 12/2012 Yanovsky et al.
2013/0061055 A1 3/2013 Schibuk
2013/0086691 A1 4/2013 Fielder
2013/0145465 A1 * 6/2013 Wang .................... G06F 21/552 726/23
2013/0212644 A1 8/2013 Hughes et al.
2013/0227697 A1 8/2013 Zandani
2013/0263226 A1 10/2013 Sudia
2013/0318594 A1 * 11/2013 Hoy .................... H04L 63/0272 726/15
2014/0082730 A1 3/2014 Vashist et al.

(56) References Cited

U.S. PATENT DOCUMENTS

2014/0101724 A1* 4/2014 Wick .................. H04L 63/1491 726/4
2014/0115706 A1* 4/2014 Silva .................. H04L 63/1425 726/23
2014/0201836 A1 7/2014 Amsler
2014/0208401 A1 7/2014 Balakrishnan et al.
2014/0237599 A1 8/2014 Gertner et al.
2014/0259095 A1 9/2014 Bryant
2014/0298469 A1 10/2014 Marion et al.
2014/0310770 A1 10/2014 Mahaffey
2014/0337978 A1 11/2014 Keromytis et al.
2014/0359708 A1 12/2014 Schwartz
2015/0007326 A1 1/2015 Mooring et al.
2015/0013006 A1 1/2015 Shulman et al.
2015/0047032 A1 2/2015 Hannis et al.
2015/0074750 A1 3/2015 Pearcy et al.
2015/0074811 A1 3/2015 Capalik
2015/0096048 A1* 4/2015 Zhang ................. G06F 21/6218 726/27
2015/0128246 A1 5/2015 Feghali et al.
2015/0156211 A1 6/2015 Chi Tin et al.
2015/0261955 A1* 9/2015 Huang .................. G06F 21/562 726/23
2015/0264062 A1 9/2015 Hagiwara et al.
2015/0326587 A1 11/2015 Vissamsetty et al.
2015/0326598 A1 11/2015 Vasseur et al.
2015/0381636 A1* 12/2015 Luckett, Jr. ......... H04L 63/1416 726/23
2016/0019395 A1 1/2016 Ramalingam et al.
2016/0072838 A1* 3/2016 Kolton .................. H04L 63/145 726/23
2016/0080414 A1 3/2016 Kolton et al.
2016/0149933 A1* 5/2016 Schrader ............. H04L 63/1491 726/23
2016/0212167 A1 7/2016 Dotan et al.
2016/0255103 A1* 9/2016 Yao ..................... G06F 9/45558 726/23
2016/0261608 A1 9/2016 Hu et al.
2016/0300227 A1 10/2016 Subhedar et al.
2016/0308895 A1 10/2016 Kotler et al.
2016/0323316 A1* 11/2016 Kolton .................. H04L 63/145
2016/0359876 A1* 12/2016 Touboul ................ G06F 21/577
2016/0359905 A1* 12/2016 Touboul ................ G06F 21/577
2016/0373447 A1* 12/2016 Akiyama ............ H04L 63/1416
2017/0032130 A1 2/2017 Durairaj et al.
2017/0093911 A1* 3/2017 Robertson ........... H04L 63/1491
2017/0134405 A1* 5/2017 Ahmadzadeh ...... H04L 63/1416
2017/0134423 A1* 5/2017 Sysman ................ G06F 21/554
2017/0171077 A1* 6/2017 Chanda ................. H04L 45/745
2017/0244672 A1* 8/2017 Shulman ............. H04L 63/0245
2017/0279884 A1* 9/2017 Yang ..................... H04L 61/103
2017/0331858 A1* 11/2017 Clark, III ............ H04L 63/1491
2017/0366563 A1* 12/2017 Volfman ............. H04L 63/1491
2018/0034858 A1* 2/2018 Gummaraju ............ H04L 63/20
2018/0048665 A1* 2/2018 Shulman ............. H04L 63/1425
2018/0103061 A1* 4/2018 Allen .................. H04L 63/1491
2018/0262529 A1* 9/2018 Allen .................... G06F 21/554
2018/0270229 A1* 9/2018 Zhang ................. H04L 63/0876
2019/0089737 A1* 3/2019 Shayevitz .............. G06N 20/00

FOREIGN PATENT DOCUMENTS

WO 2015047555 A1 4/2015
WO WO-2015047555 A1 * 4/2015 ......... H04L 63/0807

OTHER PUBLICATIONS

Sun, Kun, and Sushil Jajodia. "Protecting enterprise networks through attack surface expansion." In Proceedings of the 2014 Workshop on Cyber Security Analytics, Intelligence and Automation, pp. 29-32. ACM, 2014. (Year: 2014).*

Mokube, Iyatiti, and Michele Adams. "Honeypots: concepts, approaches, and challenges." In Proceedings of the 45th annual southeast regional conference, pp. 321-326. ACM, 2007. (Year: 2007).*

Kim, I. S., and M. H. Kim. "Agent-based honeynet framework for protecting servers in campus networks." IET Information Security 6, No. 3 (2012): 202-211. (Year: 2012).*

U.S. Appl. No. 15/175,052, Notice of Allowance, dated Jan. 2, 2018, 9 pages.

U.S. Appl. No. 15/679,180, Notice of Allowance, dated Mar. 26, 2018, 14 pages.

U.S. Appl. No. 15/722,351, Office Action, dated Mar. 9, 2018, 17 pages.

U.S. Appl. No. 15/682,577, Notice of Allowance, dated Jun. 14, 2018, 15 pages.

U.S. Appl. No. 15/641,817, Office Action, dated Jul. 26, 2018, 29 pages.

Wikipedia, Active Directory, https://en.wikipedia.org/wiki/Active_Directory, Jun. 24, 2015.

Wikpedia, Apple Filing Protocol, https://en.wikipedia.org/wiki/Apple_Filing_Protocol, Aug. 14, 2015.

Wikipedia, DMZ (computing), https://en.wikipedia.org/wiki/DMZ_(computing), Jun. 17, 2015.

Wikipedia, Domain Name System, https://en.wikipedia.org/wiki/Domain_Name_System, Jul. 14, 2015.

Wikipedia, Firewall (computing), https://en.wikipedia.org/wiki/Firewal_(computing), Jul. 14, 2015.

Wikipedia, Honeypot (computing), https://en.wikipedia.org/wiki/Honeypot_(computing), Jun. 21, 2015.

Wikipedia, Kerberos (protocol), https://en.wikipedia.org/wiki/Kerberos_(protocol), Jun. 30, 2015.

Wikipedia, Lightweight Directory Access Protocol, https://en.wikipedia.org/wiki/Lightweight_Directory_Access_Protocol, Aug. 15, 2015.

Wikipedia, LM hash, https://en.wikipedia.org/wiki/LM_hash, Jun. 8, 2015.

Wikipedia, RADIUS, https://en.wikipedia.org/wiki/RADIUS, Aug. 16, 2015.

Wikipedia, Rainbow table, https://en.wikipedia.org/wiki/Rainbow_table, Jul. 14, 2015.

Wikipedia, Secure Shell, https://en.wikipedia.org/wiki/Honeypot_(computing), Jul. 12, 2015.

Wikipedia, Security Information and Event Management, https://en.wikipedia.org/wiki/Security_information_and_event_management, Jun. 23, 2015.

Wikipedia, Tarpit (networking), https://en.wikipedia.org/wiki/Tarpit_(networking), Jul. 3, 2014.

Mishra et al., Intrusion detection in wireless ad hoc networks, IEEE Wireless Communications, Feb. 2004, pp. 48-60.

Zhang et al., Intrusion detection techniques for mobile wireless networks, Journal Wireless Networks vol. 9(5), Sep. 2003, pp. 545-556, Kluwer Academic Publishers, the Netherlands.

U.S. Appl. No. 15/004,904, Office Action, dated May 27, 2016, 16 pages.

U.S. Appl. No. 15/004,904, Notice of Allowance, dated Oct. 19, 2016, 13 pages.

U.S. Appl. No. 15/175,048, Notice of Allowance, dated Oct. 13, 2016, 17 pages.

U.S. Appl. No. 15/175,050, Office Action, dated Aug. 19, 2016, 34 pages.

U.S. Appl. No. 15/175,050, Office Action, dated Nov. 30, 2016, 31 pages.

U.S. Appl. No. 15/175,050, Notice of Allowance, dated Mar. 21, 2017, 13 pages.

U.S. Appl. No. 15/175,052, Office Action, dated Feb. 13, 2017, 19 pages.

U.S. Appl. No. 15/175,052, Office Action, dated Jun. 6, 2017, 19 pages.

U.S. Appl. No. 15/175,054, Notice of Allowance, dated Feb. 21, 2017, 13 pages.

U.S. Appl. No. 15/403,194, Office Action, dated Feb. 28, 2017, 13 pages.

U.S. Appl. No. 15/403,194, Notice of Allowance, dated Jun. 16, 2017, 9 pages.

(56) References Cited

OTHER PUBLICATIONS

U.S. Appl. No. 15/406,731, Notice of Allowance, dated Apr. 20, 2017.
PCT Application No. PCT/IL16/50103, International Search Report and Written Opinion, dated May 26, 2016, 9 pages.
PCT Application No. PCT/IL16/50579, International Search Report and Written Opinion, dated Sep. 30, 2016, 7 pages.
PCT Application No. PCT/IL16/50581, International Search Report and Written Opinion, dated Nov. 29, 2016, 10 pages.
PCT Application No. PCT/IL16/50582, International Search Report and Written Opinion, dated Nov. 16, 2016, 11 pages.
PCT Application No. PCT/IL16/50583, International Search Report and Written Opinion, dated Dec. 8, 2016, 10 pages.

* cited by examiner

DETECTING MALICIOUS ACTIVITY BY USING ENDEMIC NETWORK HOSTS AS DECOYS

CROSS REFERENCES TO RELATED APPLICATIONS

The contents of the following of applicant's US patent applications are hereby incorporated herein in their entireties.

- U.S. patent application Ser. No. 15/722,351, entitled SYSTEM AND METHOD FOR CREATION, DEPLOYMENT AND MANAGEMENT OF AUGMENTED ATTACKER MAP, and filed on Oct. 2, 2017 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.
- U.S. patent application Ser. No. 15/403,194, now U.S. Pat. No. 9,787,715, entitled SYSTEM AND METHOD FOR CREATION, DEPLOYMENT AND MANAGEMENT OF AUGMENTED ATTACKER MAP, and filed on Jan. 11, 2017 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.
- U.S. patent application Ser. No. 15/004,904, now U.S. Pat. No. 9,553,885, entitled SYSTEM AND METHOD FOR CREATION, DEPLOYMENT AND MANAGEMENT OF AUGMENTED ATTACKER MAP, and filed on Jan. 23, 2016 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.
- U.S. Provisional Application No. 62/172,251, entitled SYSTEM AND METHOD FOR CREATION, DEPLOYMENT AND MANAGEMENT OF AUGMENTED ATTACKER MAP, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.
- U.S. Provisional Application No. 62/172,253, entitled SYSTEM AND METHOD FOR MULTI-LEVEL DECEPTION MANAGEMENT AND DECEPTION SYSTEM FOR MALICIOUS ACTIONS IN A COMPUTER NETWORK, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.
- U.S. Provisional Application No. 62/172,255, entitled METHODS AND SYSTEMS TO DETECT, PREDICT AND/OR PREVENT AN ATTACKER'S NEXT ACTION IN A COMPROMISED NETWORK, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.
- U.S. Provisional Application No. 62/172,259, entitled MANAGING DYNAMIC DECEPTIVE ENVIRONMENTS, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.
- U.S. Provisional Application No. 62/172,261, entitled SYSTEMS AND METHODS FOR AUTOMATICALLY GENERATING NETWORK ENTITY GROUPS BASED ON ATTACK PARAMETERS AND/OR ASSIGNMENT OF AUTOMATICALLY GENERATED SECURITY POLICIES, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky.

FIELD OF THE INVENTION

The present invention relates to computer security, and in particular to detecting attackers of computer networks.

BACKGROUND OF THE INVENTION

Reference is made to FIG. 1, which is a simplified diagram of a prior art organization network 100 connected to an external internet 10. Network 100 is shown generally with resources including computers 110, databases 120, switches and routers 130, and mobile devices 140 such as smart phones and tablets, for ease of presentation, although it will be appreciated by those skilled in the art that organization networks today are generally much more complex and include other devices such as printers, other types of network elements such as relays, and any Internet of Things objects. The various connections shown in FIG. 1 may be direct or indirect, wired or wireless communications, or a combination of wired and wireless connections. Computers 110 and databases 120 may be physical elements or logical elements, or a mix of physical and logical elements. Computers 110 and databases 120 may be virtual machines. Computer 110 and databases 120 may be local, remote or cloud-based elements, or a mix of local, remote and cloud-based elements. Computers 110 may be client workstation computers, or server computers including inter alia file transfer protocol (FTP) servers, email servers, structured query language (SQL) servers, secure shell (SSH) servers and other application servers, or a mix of client and server computers. An organization's information technology (IT) department manages and controls network 100 in order to serve the organization's requirements and meet the organization's needs.

Access to computers 110 and servers 120 in network 100 may optionally be governed by an access governor 150, such as a directory service, that authorizes users to access computers 110 and databases 120 based on "credentials". Access governor 150 may be a name directory, such as ACTIVE DIRECTORY® developed by Microsoft Corporation of Redmond, Wash., for WINDOWS® environments. Background information about ACTIVE DIRECTORY® is available at Wikipedia. Other access governors for WINDOWS and non-WINDOWS environments, include inter alia Lightweight Directory Access Protocol (LDAP), Remote Authentication Dial-In User Service (RADIUS), and Apple Filing Protocol (AFP), formerly APPLETALK®, developed by Apple Inc. of Cupertino, Calif. Background information about LDAP, RADIUS and AFP is available at Wikipedia.

Access governor 150 may be one or more local machine access controllers. Access governor 150 may be one or more authorization servers, such as a database server or an application server.

In lieu of access governor 150, the endpoints and/or servers of network 100 determine their local access rights.

Credentials for accessing computers 110 and databases 120 include inter alia server account credentials such as <address> <username> <password> for an FTP server, an SQL server, or an SSH server. Credentials for accessing computers 110 and databases 120 also include user login credentials <username> <password>, or <username> <ticket>, where "ticket" is an authentication ticket, such as a ticket for the Kerberos authentication protocol or NTLM hash used by Microsoft Corp., or login credentials via certificates or via another implementation used today or in the future. Background information about the Kerberos protocol and the LM hash is available at Wikipedia.

Access governor 150 may maintain a directory of computers 110, databases 120 and their users. Access governor 150 authorizes users and computers, assigns and enforces security policies, and installs and updates software. When a user logs into a computer 110, access governor 150 checks the submitted password, and determines if the user is an administrator (admin), a normal user (user) or other user type.

Computers 110 may run a local or remote security service, which is an operating system process that verifies users logging in to computers and other single sign-on systems and other credential storage systems.

Network 100 may include a security information and event management (SIEM) server 160, which provides real-time analysis of security alerts generated by network hardware and applications. Background information about SIEM is available at Wikipedia.

Network 100 may include a domain name system (DNS) server 170, or such other name service system, for translating domain names to IP addresses. Background information about DNS is available at Wikipedia.

Network 100 may include a firewall 180 located within a demilitarized zone (DMZ), which is a gateway between organization network 100 and external internet 10. Firewall 180 controls incoming and outgoing traffic for network 100. Background information about firewalls and DMZ is available at Wikipedia.

One of the most prominent threats that organizations face is a targeted attack; i.e., an individual or group of individuals that attacks the organization for a specific purpose, such as leaking data from the organization, modifying data and systems, and sabotaging data and systems.

Targeted attacks are carried out in multiple stages, typically including inter alia reconnaissance, penetration, lateral movement and payload. Lateral movement involves establishing a foothold within the organization and expanding that foothold to additional systems within the organization.

In order to carry out the lateral movement stage, an attacker, whether a human being who is operating tools within the organization's network, or a tool with "learning" capabilities, learns information about the environment it is operating in, such as network topology, organization structure, and implemented security solutions, and then operates in accordance with that data. One method to defend against such attacks is to plant misleading information/decoys/bait with the aim that the attacker learns of their existence and consumes those bait resources, which are monitored so as to notify an administrator of malicious activity. In order to monitor usage of deceptive information, decoy servers, referred to as "honeypots", are deployed in the organization. Background information about honeypots is available at Wikipedia.

Decoy servers try to mimic attractive real servers. However, a challenge in deploying decoy servers is to make then appear authentic. Specifically, an effective honeypot needs to appear reliable to an attacker, in particular matching attributes of real hosts such as operating system types, and local installed products. Accomplishing this is difficult and generally requires continuous manual work.

A further challenge in deploying decoy servers is to scale them to efficiently cover the organization. Specifically, in conventional organization networks, there are many more real hosts than decoy servers. The limited number of decoy servers enables an attacker to flag each one and avoid detection.

SUMMARY

Embodiments of the present invention detect attackers performing reconnaissance and lateral movement in organization network environments. The present invention overcomes the above challenges by using endemic hosts to host decoy agents. An endemic network host is an endpoint, server, or other network resource that is native to a specific organizational network. An endemic network host is an actual host that is part of the organization network.

An endemic host matches other hosts in the network, inter alia, in operating system (OS) types, OS settings, installed applications, installed updates, and hardware attributes. The present invention provides several advantages vis-à-vis conventional decoy systems.

Use of endemic hosts prevents fingerprinting of decoy servers by attackers. Use of endemic hosts thwarts an attacker's ability to flag each decoy server.

Conventional decoy systems require dedicating a significant amount of computing and networking resources of the organization for use as decoys. Use of endemic hosts dramatically reduces the cost of decoy systems.

To be effective, conventional decoy systems require deployment of a decoy server in each subnet and VLan. Use of endemic hosts guarantees that decoy solutions exist in all network segments.

There is thus provided in accordance with an embodiment of the present invention a system for detecting malicious activity in an organization network that includes network hosts, endemic decoy hosts (EDHs) and trap servers, wherein an EDH is an actual resource in the network used to host a decoy agent, including a deception management server having administrative credentials for the organization network, (1) planting deceptions within network hosts, (2) distributing a decoy agent to each EDH, and (3) generating a deception scheme setting forth (i) which deceptions to plant in which network hosts, (ii) for each decoy agent, which ports of the decoy agent's EDH to activate as decoy ports, and (iii) which trap server the decoy agent should proxy communication to in response to the decoy agent identifying an attempt to communicate with the decoy agent's EDH via one of the decoy ports, at least one network host with deceptions planted therewithin by the deception management server, each deception including information including at least one decoy communication port of an EDH, at least one EDH, each EDH having a first group of ports for conventional communication applications, and a second group of ports, referred to as decoy ports, for connection by an attacker from a network host that the attacker has breached, using a deception planted in the breached network host, wherein each decoy agent is programmed to alert said deception management server, and to proxy communication with the attacker to a trap server, in response to the decoy agent identifying the attacker attempting a connection to the decoy agent's EDH via one of the decoy ports, at least one trap server, to which a decoy agent proxies communication with the attacker, and a forensic collector that collects, from the breached network host, forensics of the attacker's activity vis-à-vis the breached network host, when said decoy agent acts as a proxy between the attacker and a trap server.

There is additionally provided in accordance with an embodiment of the present invention a method for detecting malicious activity in an organization network that includes network hosts, endemic decoy hosts (EDHs) and trap servers, wherein an EDH is an actual resource in the network used to host a decoy agent, including planting, by a deception management server, deceptions within network hosts, each deception providing information that includes at least one decoy communication port of an EDH, distributing, by the deception management server, decoy agents to EDHs, wherein each EDH has a first group of ports for conventional communication applications, and a second group of ports, referred to as decoy ports, for connection by an attacker who has breached a network host using a deception planted in the breached network host, and wherein each decoy agent alerts the deception management server in response to identifying an attempted connection to the decoy agent's EDH via a decoy port, generating, by the deception management server, a deception scheme setting forth (i) which deceptions to plant in which network hosts, (ii) for each decoy agent, which ports of the decoy agent's EDH to activate as decoy ports, and (iii) which trap server the decoy agent should proxy communication to, when an attempt to communicate with the decoy agent's EDH via one of the decoy ports is identified, proxying, by each decoy agent, communication with the attacker through a trap server, in response to the decoy agent identifying an attempt by the attacker to connect to the EDH by one of the decoy ports, triggering, by the trap server, an alert to the deception management server when a decoy agent proxies communication between the attacker to the trap server, and collecting, from the breached network host, forensics of the attacker's activity vis-à-vis the breached network host, when the decoy agent acts as a proxy between the attacker and the trap server.

BRIEF DESCRIPTION OF THE DRAWINGS

The present invention will be more fully understood and appreciated from the following detailed description, taken in conjunction with the drawings in which.

For reference to the figures, the following TABLE I, listing elements in the figures and their respective descriptions, is provided. Similarly numbered elements in the figures represent elements of the same type, but they need not be identical elements.

TABLE I

Elements in the figures

Figure 1:
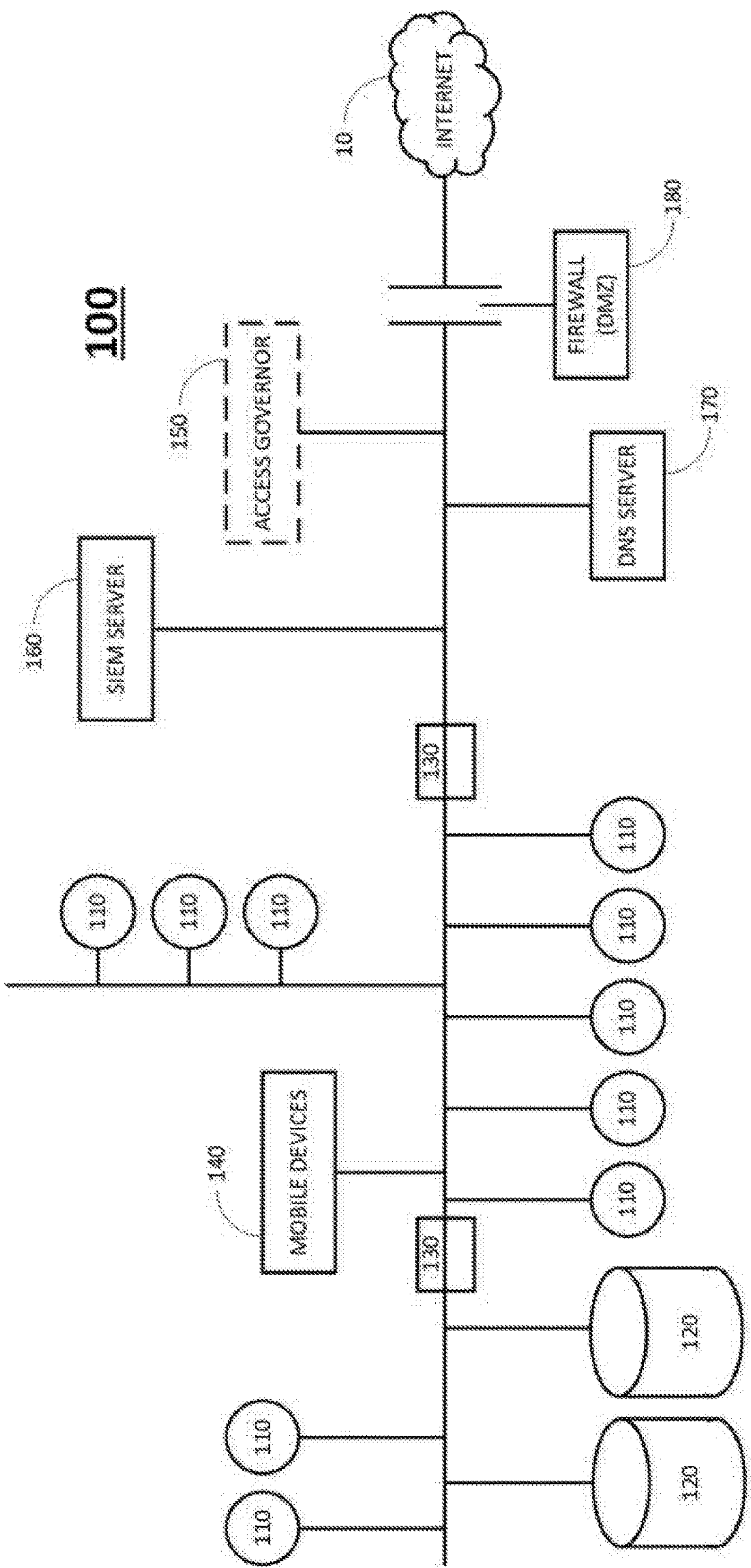
FIG. 1 is a simplified diagram of a prior art enterprise network connected to an external internet.

| Element | Description |
|---|---|
| 10 | Internet |
| 100 | enterprise network |
| 110 | network hosts |
| 120 | network databases |
| 130 | network switches and routers |
| 140 | mobile devices |
| 150 | access governor (optional) |
| 160 | SIEM server |
| 170 | DNS server |
| 180 | firewall |
| 200 | enterprise network with endemic decoy hosts |
| 210 | network hosts with deception objects |
| 211 | decoy agent within endemic network host |
| 212 | decoy port within endemic network host |
| 220 | network databases with deception objects |
| 230 | deception management server |
| 231 | deployment module |
| 233 | forensic application |
| 240 | trap servers |
| 242 | forensic alert module |

Elements numbered in the 1000's are operations of flow charts.

The following definitions are employed throughout the specification.

DECEPTION MANAGEMENT SERVER—a server responsible for deploying deceptions and decoy agents, for managing alerts and reports, for issuing updates and removal as necessary, and for running a user interface for administration.

DECEPTION—a data object hidden inside a resource, which contains credentials for an attacker to find. Credentials include inter alia one or more of a username, a password and a target address.

DECOY AGENT—a component that runs on a host and is in charge of listening to a decoy port, sending alerts to a deception management server, and proxying communication to a trap server. A decoy agent may be implemented in software or hardware, or a combination of software and hardware. A software decoy agent runs as a process on the endemic decoy host OS. A hardware decoy agent uses an incoming component on the host that monitors and diverts incoming and outgoing communication; e.g., a component similar to Intel's Active Management Technology (AMT). A decoy agent has two operation modes; namely, block and proxy. In block mode, the decoy agent triggers an alert when it identifies an incoming communication. In proxy mode, the decoy agent triggers an alert and proxies communication to a trap server, thereby providing an interactive experience to an attacker.

DECOY PORT—the port(s) that a decoy agent listens to. Decoy ports include inter alia the following services/ports, when they are not in conventional use: SMB (445), RDP (3389), HTTP/S (80/443), Telnet, SSH (22), FTP (21), and databases (various ports).

ENDEMIC DECOY HOST (EDH)—an endemic network host used to host decoy agents.

ENDEMIC HOST—an actual endpoint server or other network resource that is native to a specific organizational network. An endemic host matches other hosts on the network inter alia in OS type, OS setting, installed applications, installed updates, and hardware attributes.

NETWORK HOST—an endemic host computer in the organization network that can be breached by an attacker, and in which deceptions are planted.

TRAP SERVER—a dedicated server responsible for handling attacker interaction. Communication is proxied to a trap server by decoy agents.

DETAILED DESCRIPTION

Figure 2:
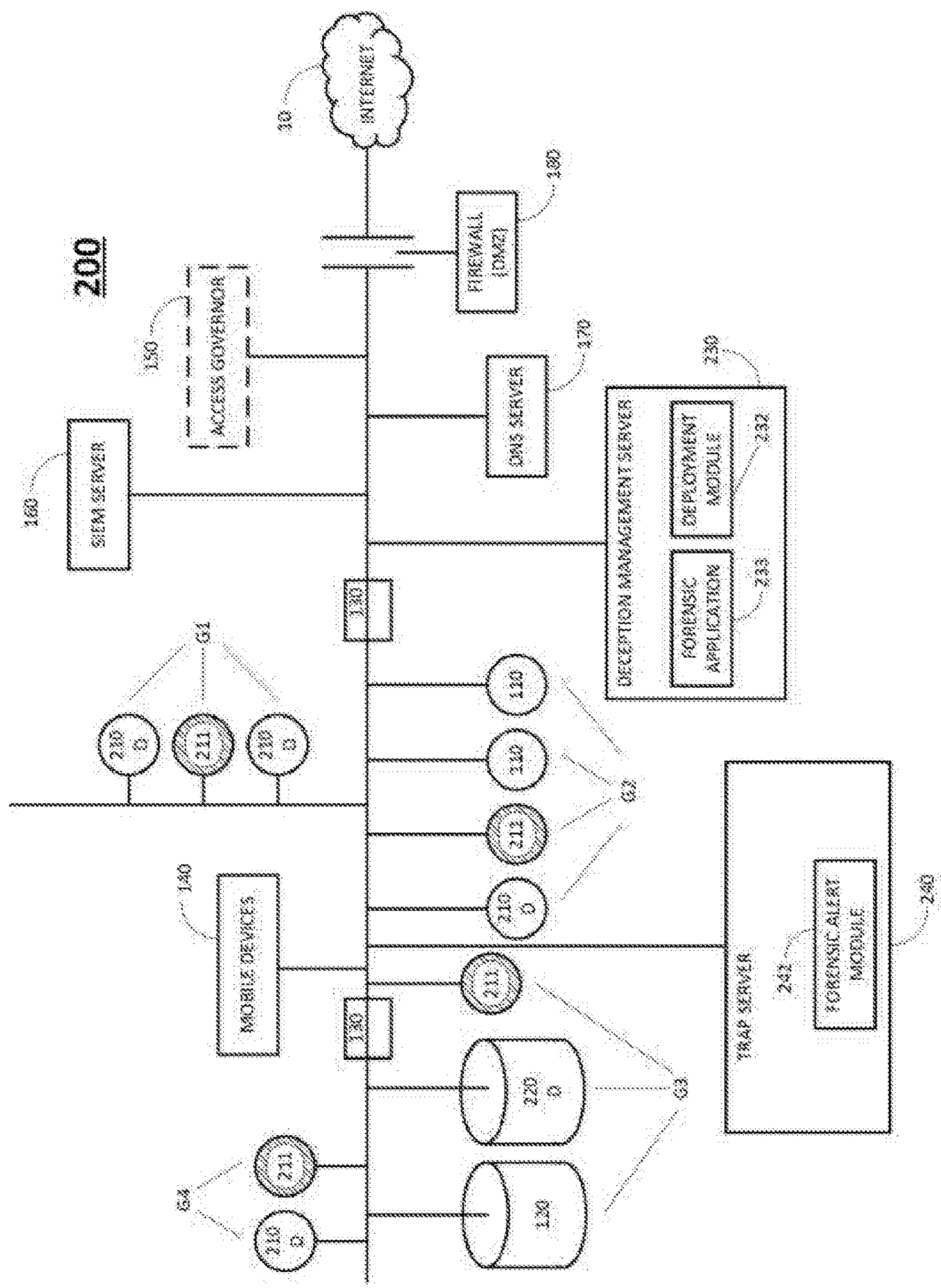
FIG. 2 is a simplified diagram of a system that uses endemic decoy hosts (EDHs), in accordance with an embodiment of the present invention.

Reference is made to FIG. 2, which is a simplified diagram of a system that uses endemic decoy hosts (EDHs), in accordance with an embodiment of the present invention. In addition to the conventional components of FIG. 1, FIG. 2 shows a network 200 that includes network hosts 210 with deceptions planted therein, EDHs including decoy accents 211, network databases 220 with deceptions, a deception management server 230 including a deployment module 231 and a forensic application 232, and a trap server 240 including a forensic alert module 242.

Network hosts 210 and network databases 220 are resources in network 200 that may be breached by attackers, in which deceptions (D) are planted. EDHs are resources in network 200 that host decoy agents 211. FIG. 2 shows four groups of resources; namely, G1, G2, G3 and G4. These groups may be subnets or VLans, or resources of different business units of the organization. Each group includes at least one network host 210 and at least one EDH.

Decoy agents 211 are components running on the EDHs, configured to listen to specific decoy ports. The specific decoy ports include inter alia the following services/ports when they are not in conventional use: SMB (445), RDP (3389), HTTP/S (80/443), Telnet, SSH (22), FTP (121), and database ports. In response to an attempt to connect to an EDH using a decoy port, decoy agent 211 sends an alert to deception management server 230, and proxies communication through trap server 240. By proxying communication through trap server 240, decoy agent 211 causes the attacker to believe that he is communicating with the EDH, whereas in reality the attacker is communicating with trap server 240. Trap server 240 is capable of generating interactive responses to the attacker communications, such as replying with web pages (Web), files and folders (shares, FTP) and interactive desktop (RDP), allowing defenders to stall the attacker and analyze his objectives.

Decoy agent 211 may be implemented in software, in hardware, or in a software/hardware combination. For a software implementation, decoy agent 211 runs as a process on the EDH operation system. For a hardware implementation, decoy agent 211 uses an inline component on the EDH, which is capable of monitoring and diverting incoming and outgoing communication; e.g., a component similar to Intel's Active Management Technology (AMT). In an embodiment of the present invention, decoy agent 211 has two operations modes; namely, block and proxy. In block mode, decoy agent 211 triggers an alert when decoy agent 211 identifies an attempt to connect to the EDH using a decoy port 212. In proxy mode, decoy agent 211 triggers an alert and proxies communication to trap server 240, which provides the attacker with an interactive experience, when decoy agent 211 identifies an attempt to connect to the EDH using a decoy port 212.

Management server 230 has administration credentials for network 200. Management server 230 is operative to deploy the deceptions and decoy agents 211, to manage alerts and reports, to issue updates and removals as necessary, and to run the user interface for administration.

Trap server 240 is a dedicated server for handling attacker interaction. Communications are proxied to trap sever 240 by decoy agents 211. Trap server 240 runs services that interact with the attacker.

Figure 3:
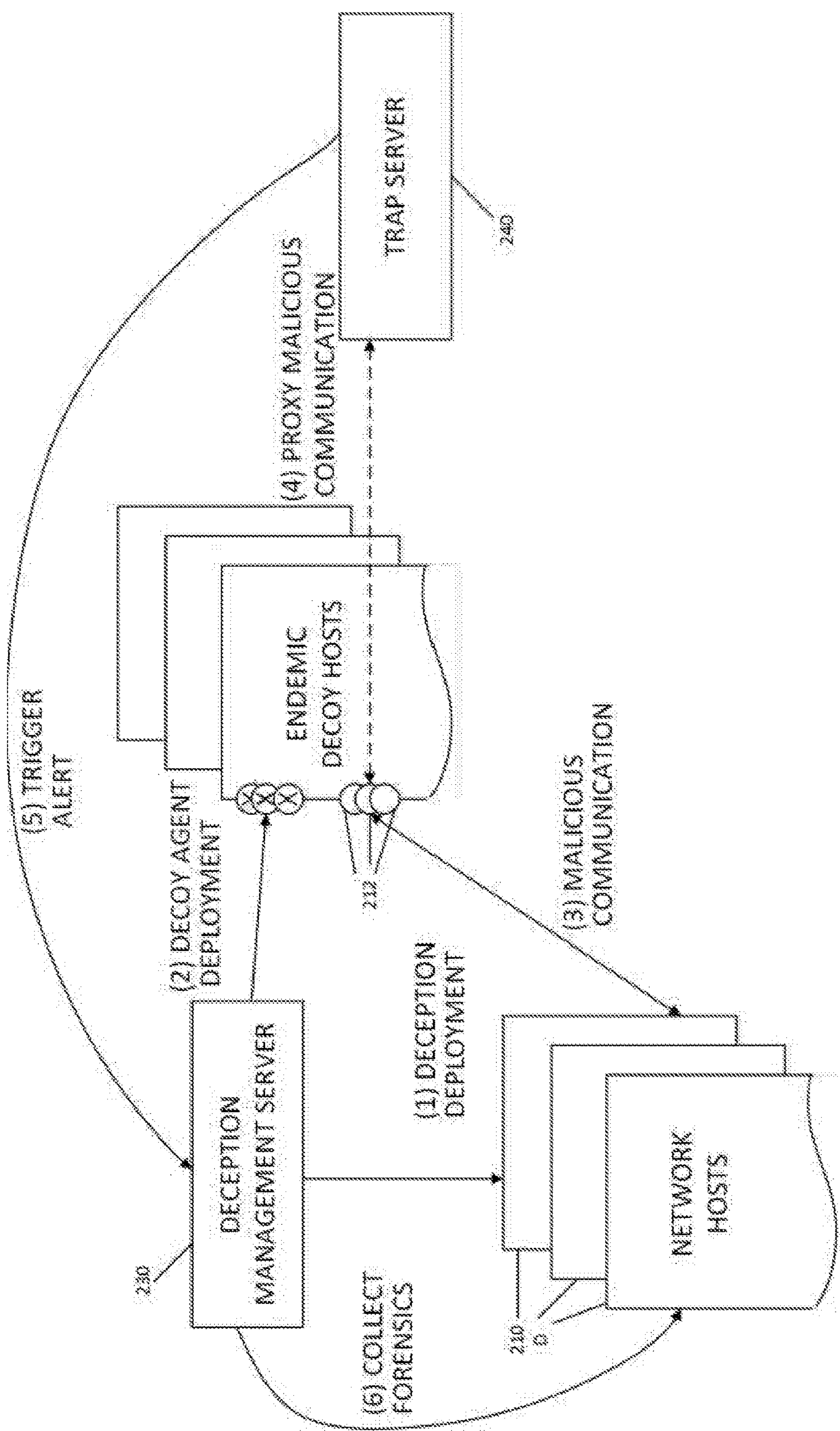
FIG. 3 is a simplified flow diagram for the system of FIG. 2, in accordance with an embodiment of the present invention.

Reference is made to FIG. 3, which is a simplified flow diagram for the system of FIG. 2, in accordance with an embodiment of the present invention. FIG. 3 shows how decoy agent 211 proxies communication between a network host breached by an attacker and trap server 240, and how deception management server 230 collects forensic data from the breached network host. FIG. 3 shows six stages, as follows.

At stage 1, deception management server 230 plants deceptions in network hosts 210. At stage 2, deception management server 230 plants decoy agents 211 in EDHs. At stage 3, an attacker breaches a network host 210 and, based on a deception planted in network host 210 by deception management server 230, attempts to maliciously access an EDH via a decoy port 212 of the EDH. At stage 4, decoy agent 211 of the EDH proxies communication with the attacker via trap server 240. At stage 5, trap server 240 triggers an alert to deception management server 300. At stage 6, deception management server collects forensics from the network host 210 that was breached by the attacker, regarding the processes run and tools used by the attacker.

Figure 4:
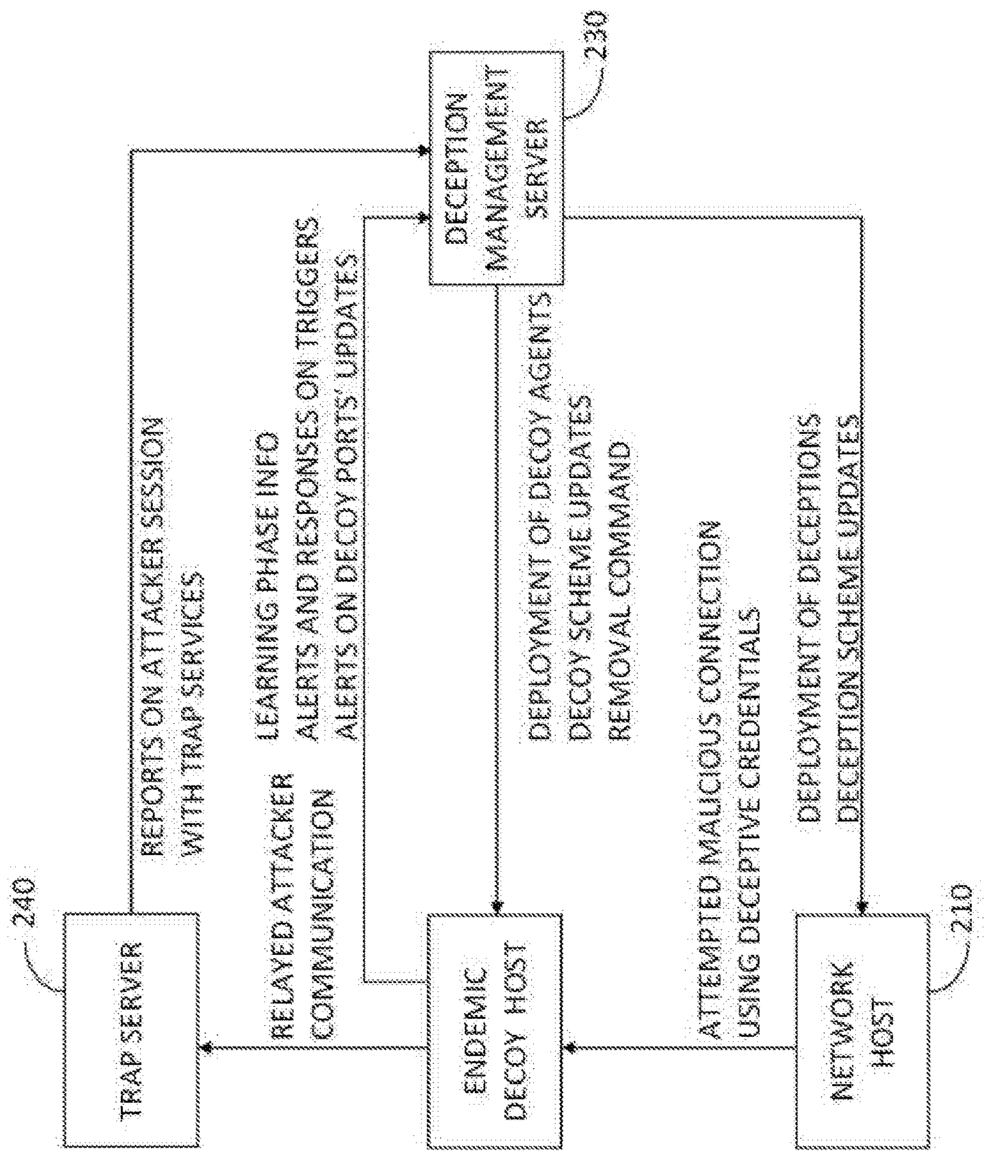
FIG. 4 is a simplified dataflow diagram for the system of FIG. 2, in accordance with an embodiment of the present invention.

Reference is made to FIG. 4, which is a simplified dataflow diagram for the system of FIG. 2, in accordance with an embodiment of the present invention. FIG. 4 shows deception management server 230 deploying deceptions in network hosts 210, and updating detection schemes. Deception management server 230 also deploys decoy agents 211 in EDHs, and updates decoy schemes. Deception manager also issues removal commands to EDHs, for removing decoy ports, generally because the ports are required for an installed application.

FIG. 4 shows an attacker attempting a malicious connection to an EDH using deceptive credentials obtained from a network host 210. FIG. 4 shows the EDH relaying the attacker's communication to trap server 240, where decoy agent 211 acts as a proxy between the attacker and trap server 240. FIG. 4 shows trap server 240 sending reports on attacker sessions with trap services to deception management server 230. FIG. 4 shows EDHs sending learning phase information, alerts and responses on triggers, and alerts on decoy port updates to deception management server 230. The learning phase is discussed below with reference to FIG. 7.

Figure 5:
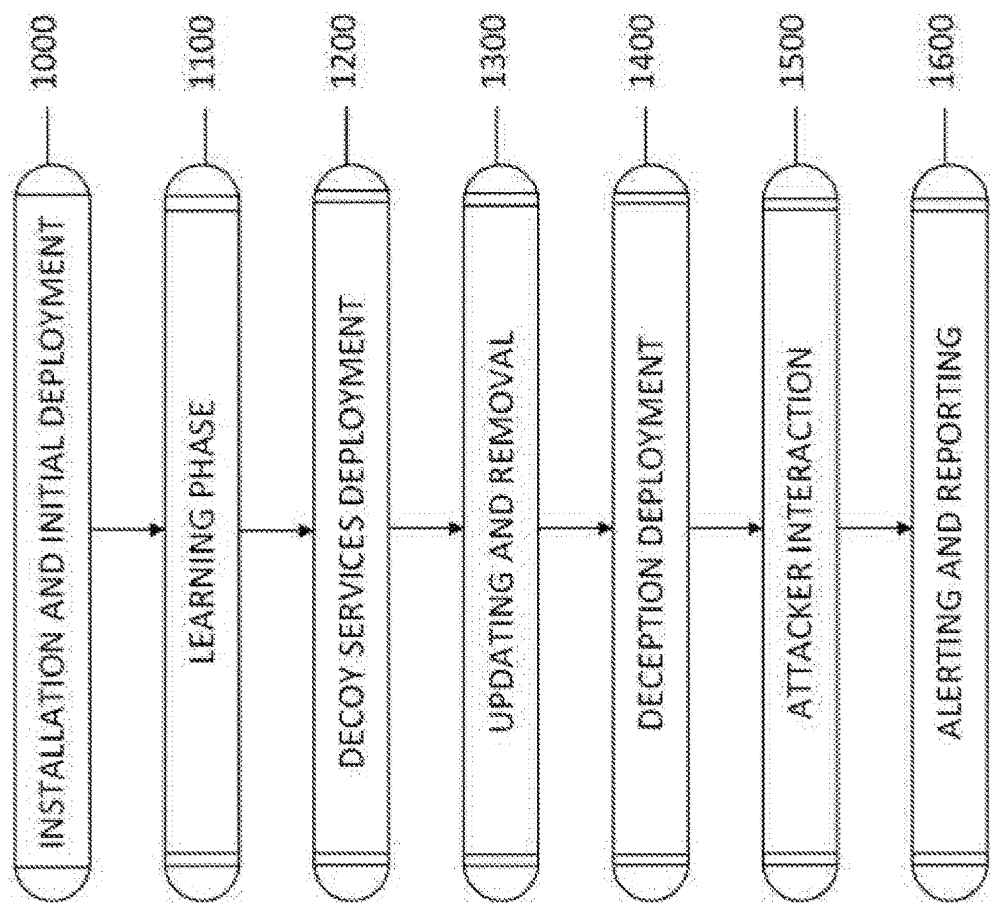
FIG. 5 is a simplified overall flowchart of a method for detecting malicious activity using EDHs, in accordance with an embodiment of the present invention.

Reference is made to FIG. 5, which is a simplified overall flowchart of a method for detecting malicious activity using EDHs, in accordance with an embodiment of the present invention. Operation 1000 is installation and initial deployment of the decoy agents 211 on EDHs. Operation 1000 is discussed below with reference to FIG. 6.

Operation 1100 is the learning phase, during which each decoy agent 211 identifies which ports of its EDH may be used as decoy ports. Operation 1100 is discussed below with reference to FIG. 7.

Operation 1200 is decoy services deployment, whereby deception management server 230 sends each decoy agent 211 the scheme of which of its EDH ports to activate as decoy ports, and which trap server to proxy communication via a decoy port to. Operation 1200 is discussed below with reference to FIG. 8.

Operation 1300 is updating and removal of software and deception schemes, and updating of decoy ports. Operation 1300 is discussed below with reference to FIG. 9.

Operation 1400 is deception deployment for network hosts. Operation 1400 is discussed below with reference to FIG. 10.

Operation 1500 is attacker breach of a network host, and interaction with network 200. Operation 1500 is discussed below with reference to FIG. 11.

Operation 1600 is alerting and reporting an attacker to deception management server 230. Operation 1600 is discussed below with reference to FIG. 12.

Figure 6:
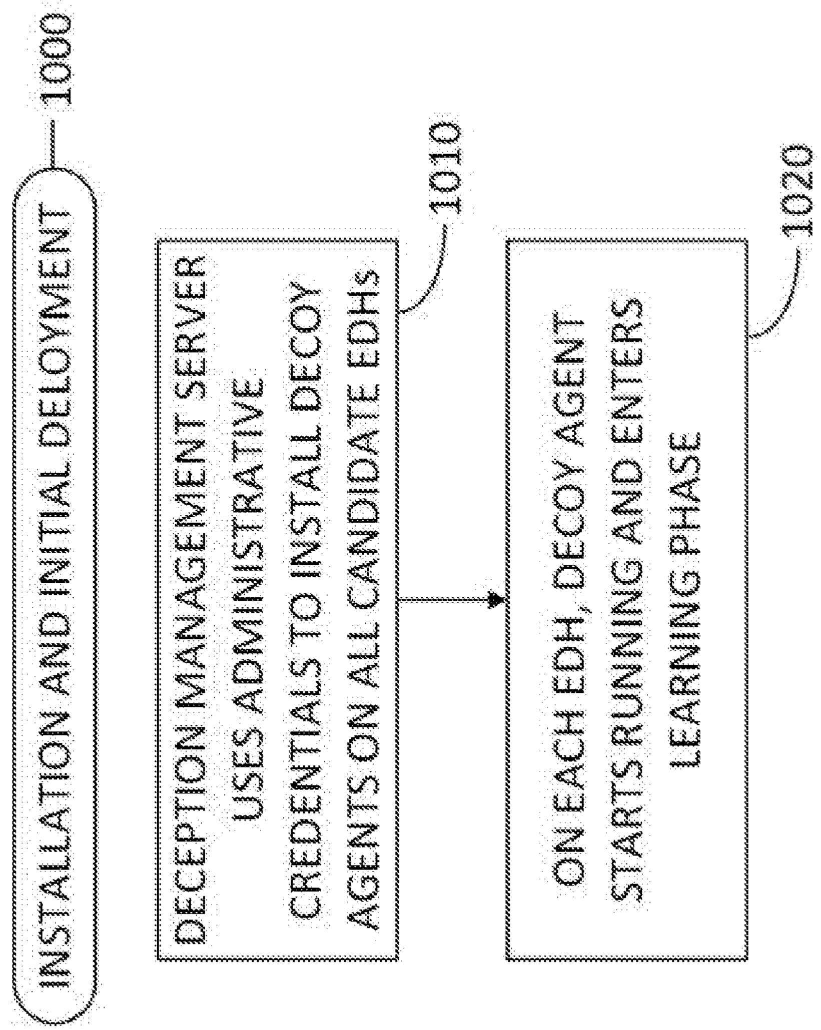
FIG. 6 is a simplified flowchart of a method for the installation and initial deployment operation of FIG. 5, in accordance with an embodiment of the present invention.

Reference is made to FIG. 6, which is a simplified flowchart of a method for the installation and initial deployment operation 1000 of FIG. 5, in accordance with an embodiment of the present invention. Deception management server 230 has administration credentials for network 200. At operation 1010 deception management server 230 uses its administrative credentials to install decoy agents 211 on candidate EDHs. The EDHs are shown with cross-hatching in FIG. 2, and deployment of decoy agents 211 in EHDs is shown at stage 2 of FIG. 3, and along the arrow from deception management server 230 to EDH in FIG. 4.

At operation 1020, on each EDH its deployed decoy agent begins running and enters a learning phase.

Figure 7:
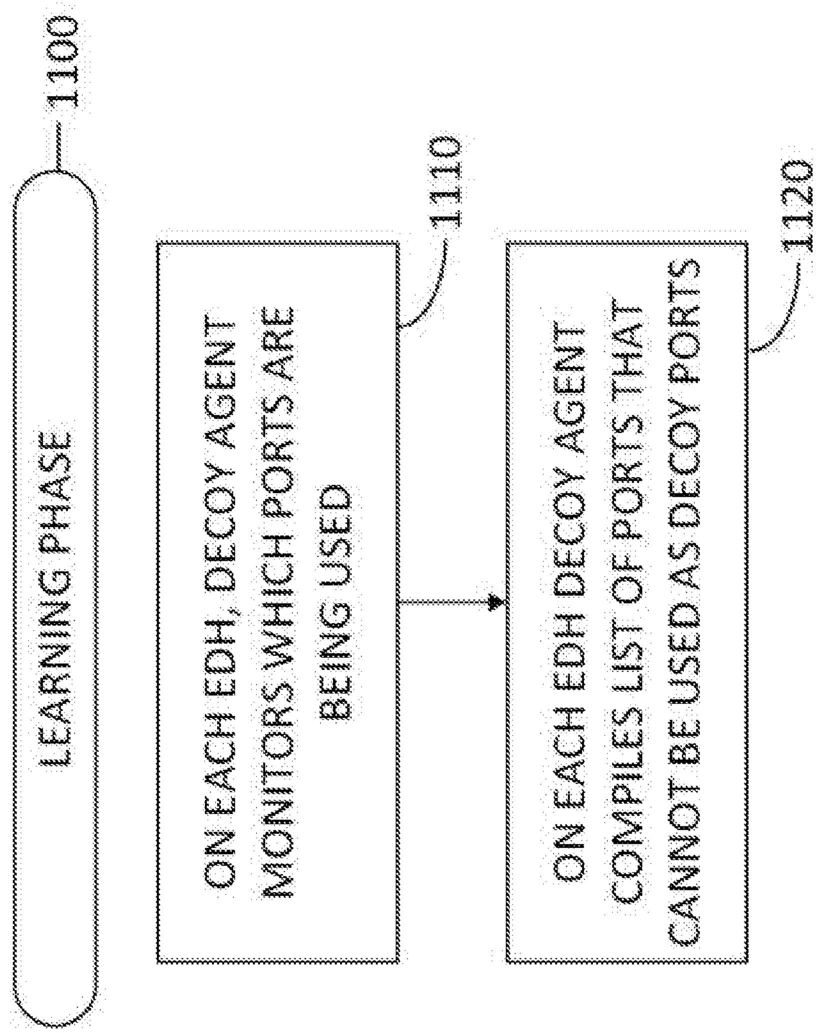
FIG. 7 is a simplified flowchart of a method for the learning phase operation of FIG. 5, in accordance with an embodiment of the present invention.

Reference is made to FIG. 7, which is a simplified flowchart of a method for the learning phase operation 1100 of FIG. 5, in accordance with an embodiment of the present invention. At operation 1110, on each EDH the decoy agent 211 monitors which ports are being used for conventional applications by the EDH. At operation 1120, each decoy agent 211 compiles a list of ports that discovered to be in conventional use during the learning phase, and thus cannot be used as decoy ports. E.g., a Windows machine with an RDP and SMB running indicates that ports 445 and 3389 are being used conventionally. Deception management server 230 may select the unused port 80 to serve as a decoy port on the EDH.

Figure 8:
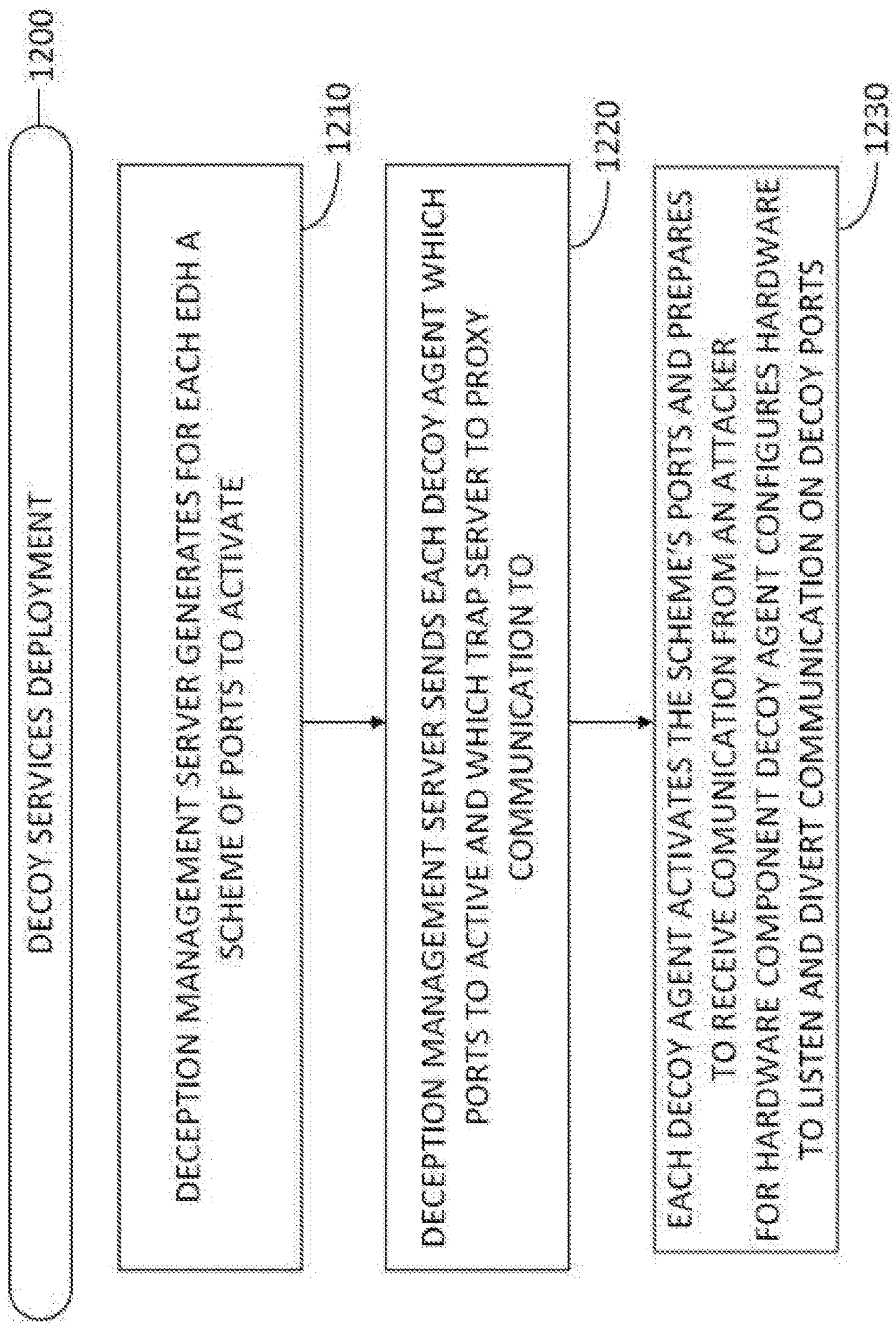
FIG. 8 is a simplified flowchart of a method for the decoy services deployment operation of FIG. 5, in accordance with an embodiment of the present invention.

Reference is made to FIG. 8, which is a simplified flowchart of a method for the decoy services deployment operation 1200 of FIG. 5, in accordance with an embodiment of the present invention. At this stage deception management server 230 has learned during learning phase 1100 which ports of EDHs in network 200 are already in conventional use, and at operation 1210 deception management server 230 generates a scheme of ports to activate as decoy ports for each EDH. At operation 1220 deception management computer 230 sends each decoy agent 211 information as to (i) which ports to activate as decoy ports, and (ii) which trap server to proxy communication to via a decoy port to. At operation 1230 each decoy agent 211 activates its decoy ports, and is ready to receive communication from attackers. In the embodiment where decoy agent 211 is a hardware component, decoy agent 211 configures the hardware to listen and divert communication on the decoy ports.

A monitoring screen of deception management computer 230 may appear as in TABLE II below.

TABLE II

Monitoring screen

| EDH name | IP | Used ports | Decoy ports | Decoy agent type | Last update | State |
|---|---|---|---|---|---|---|
| Host A | 192.168.10.11 | 445, 3389 | 80 | software | Jan. 1, 2018 | active |
| Host B | 192.168.10.12 | 21, 22 | 445 | hardware | Jan. 2, 2018 | active |

Figure 9:
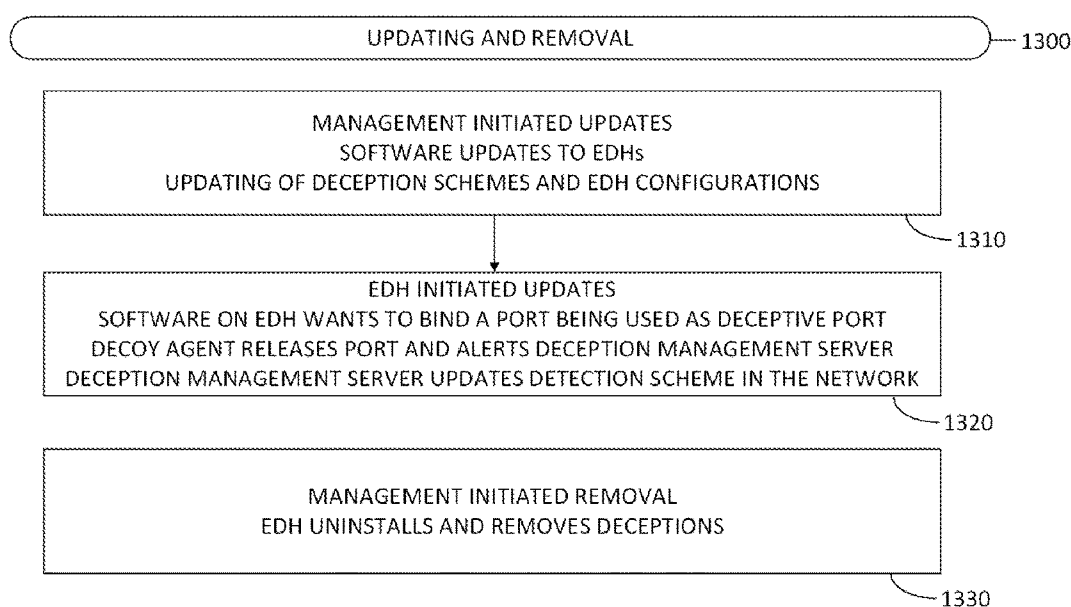
FIG. 9 is a simplified flowchart of a method for the updating and removal operation of FIG. 5, in accordance with an embodiment of the present invention.

Reference is made to FIG. 9, which is a simplified flowchart of a method for the updating and removal operation 1300 of FIG. 5, in accordance with an embodiment of the present invention. Updates are triggered in two ways; namely, (i) management-initiated updates and (ii) EDH-initiated updates. At operation 1310 management-initiated updates occur inter alia for updating software on the EDHs, and for updating of deception schemes and EDH configurations, to change details as to which ports are activated and to which trap servers communication is proxied. At operation 1320 EDH-initiated updates occur, generally in a situation where software on the EDH wishes to bind a port which the decoy agent on the EDH is currently using as a deceptive port. Without the intervention of EDH-initiated updates, the software would not be able to bind the port. Decoy agent 211 has hooks at relevant places, such as Winsock Bind function on a Windows machine, alerting decoy agent 211 that the software wishes to use an activate port. When such an event happens, decoy agent 211 releases the port and alerts deception management server 230. In turn, deception management computer 230 updates the deception scheme in the network accordingly, so as to accommodate the software. At operation 1330, deception management server 230 initiates removal, causing the EDHs to uninstall and to remove deceptions.

Figure 10:
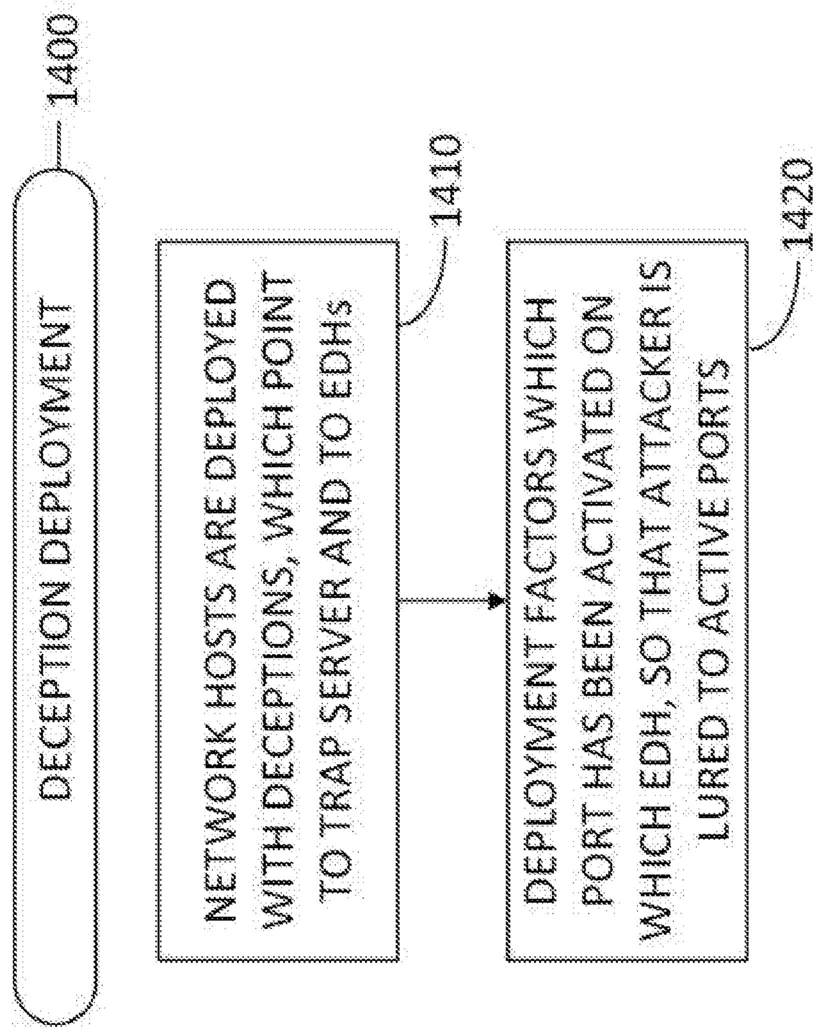
FIG. 10 is a simplified flowchart of a method for the deception deployment operation of FIG. 5, in accordance with an embodiment of the present invention.

Reference is made to FIG. 10, which is a simplified flowchart of a method for the deception deployment operation 1400 of FIG. 5, in accordance with an embodiment of the present invention. At operation 1410 network hosts 210 are deployed with deceptions (D). These deceptions include inter alia deceptive attack vectors that point to trap servers, as described in Applicant's U.S. Pat. No. 9,553,885 entitled SYSTEM AND METHOD FOR CREATION, DEPLOYMENT AND MANAGEMENT OF AUGMENTED ATTACKER MAP, the contents of which are hereby incorporated by reference; and also include deceptions pointing to decoy ports of EDHs. At operation 1420, deployment of these deceptions is based on which ports have been activated as decoy ports on each EDH, so that attackers are lured only to active decoy ports.

Figure 11:
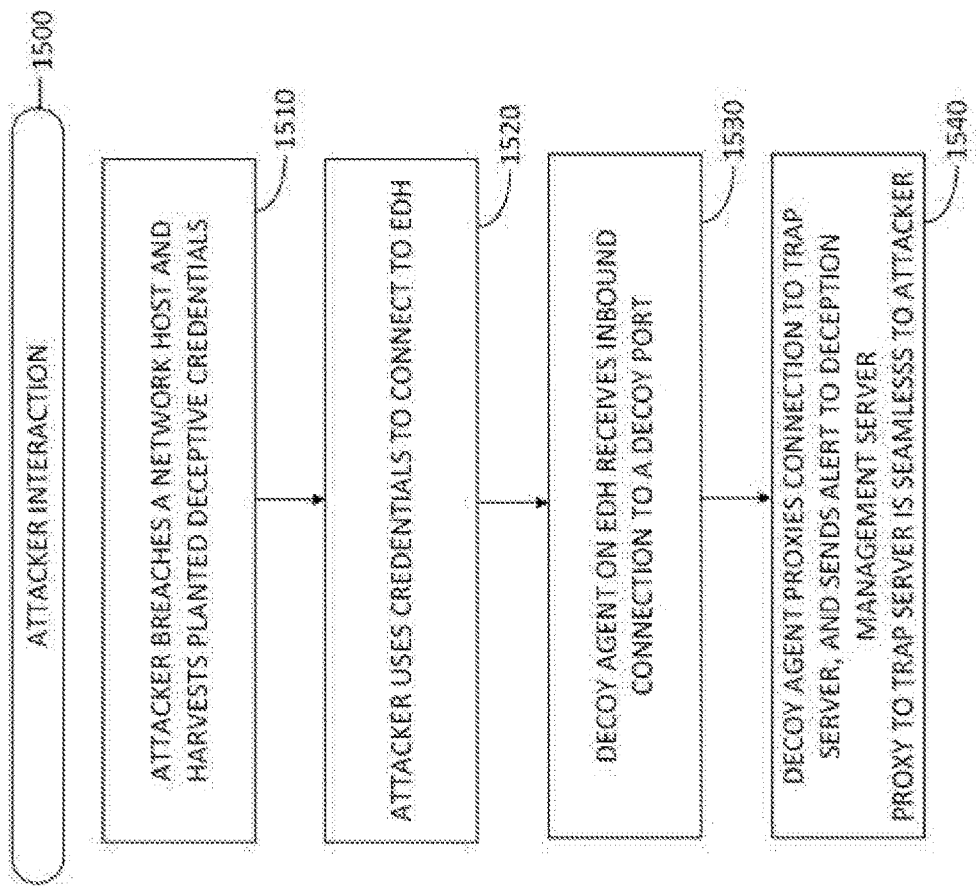
FIG. 11 is a simplified flowchart of a method for the attacker interaction operation of FIG. 5, in accordance with an embodiment of the present invention.

Reference is made to FIG. 11, which is a simplified flowchart of a method for the attacker interaction operation 1500 of FIG. 5, in accordance with an embodiment of the present invention. At operation 1510 the attacker breaches one of network hosts 210 and harvests the planted deceptive credentials pointing to an EDH. At operation 1520 the attacker tries to use the deceptive credentials to connect to the EDH. At operation 1530, decoy agent 211 on the EDH receives an inbound communication to connect via one of the decoy ports. At operation 1540 decoy agent 211 proxies the connection to the appropriate dedicated trap server 240, as specified in the deception scheme. Decoy agent 211 also sends an alert to deception management server 230. The alert includes the IP address and port of the source machine, namely the breached network host, the IP address of the target machine, and the decoy port. The proxy to trap server 240 is seamless to the attacker. From the attacker's perspective it appears with the attacker is communicating with the EDH.

E.g., an attacker may harvest deceptive credentials from a user's web browser that point to a deceptive wiki web browser, which appears to be hosted by an EDH. On the EDH, decoy agent 211 lists on port 80 and 443 for inbound communication. It receives a connection from the attacker, and sends it by proxy to trap server 240. Trap server 240 is an actual web server, hosting a fake wiki website. As such, the attacker is deceived into believing he is actually browsing a wiki web server hosted by the EDH, while his actions are being monitored, reported and investigated.

Similar examples include cases where trap server 240 responds to attacker communication with shares and/or FTP files and folders, and interactive desktop RDP, allowing defenders to stall attackers and analyze their objectives.

Figure 12:
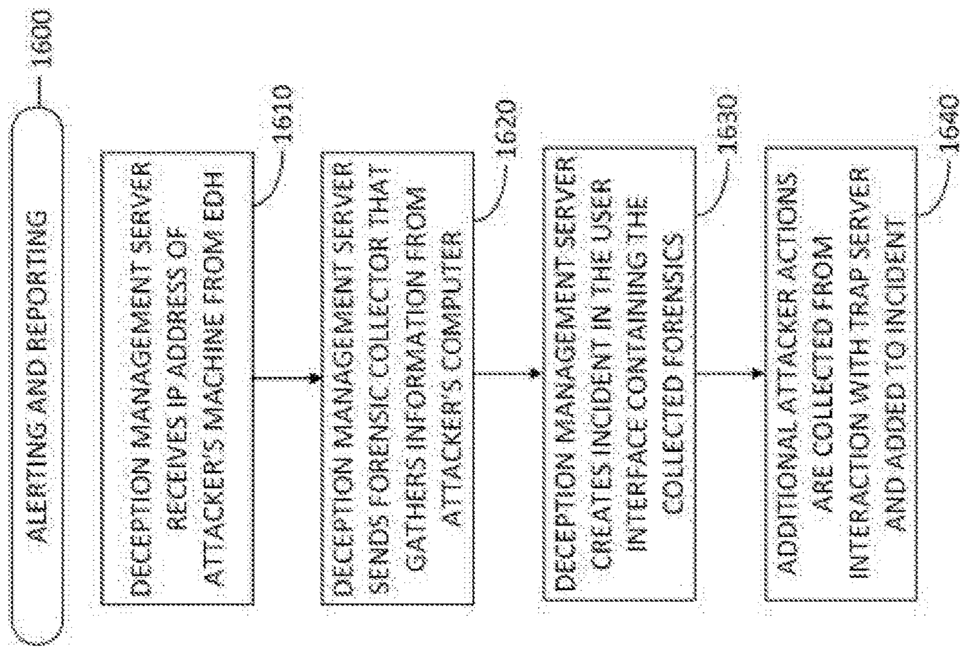
FIG. 12 is a simplified flowchart of a method for the alerting and reporting operation of FIG. 5, in accordance with an embodiment of the present invention.

Reference is made to FIG. 12, which is a simplified flowchart of a method for the alerting and reporting operation 1600 of FIG. 5, in accordance with an embodiment of the present invention. At operation 1610 deception management server 230 receives from the EDH the IP address of the attacker's machine; namely, the breached network host. At operation 1620 deception management server 230 sends a forensic collector that gathers information from the attacker's machine. At operation 1630 deception management server 230 creates an incident in the user interface that includes the collected forensics. At operation 1640 additional attacker actions that are collected from the interaction with trap server 240 are added to the opened incident.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A system for detecting malicious activity in an organization network that includes network hosts, endemic decoy hosts (EDHs) and trap servers, wherein an EDH is an actual resource in the network used to host a decoy agent, comprising:

a deception management server having administrative credentials for the organization network, configured to (1) store deceptions within network hosts, each deception providing information that includes at least one decoy communication port of an EDH, (2) distribute a decoy agent to each EDH, wherein each decoy agent comprises active running hardware or software, and each decoy agent is configured to release a decoy port when software on the decoy agent's EDH attempts to bind a port that is currently being used as a decoy port, and (3) generate a deception scheme setting forth (i) which deceptions to store in which network hosts, (ii) for each decoy agent, which ports of the decoy agent's EDH to activate as decoy ports, and (iii) which trap server the decoy agent proxies communication to in response to the decoy agent identifying an attempt to communicate with the decoy agent's EDH via one of the decoy ports, wherein a deception stored in a web browser of a network host points to a deceptive web server, and wherein the trap server, to which the decoy agent proxies communication with an attacker who follows the deception, is a web server hosting a deceptive website;

at least one network host configured to store deceptions received from said deception management server;

at least one EDH, each EDH having a first group of ports for communication applications, and a second group of ports, referred to as decoy ports, for connection by an attacker from a network host that the attacker has breached, using a deception stored in the breached network host, wherein each decoy agent is programmed to alert said deception management server, and to proxy communication with the attacker to a trap server, in response to the decoy agent identifying the attacker attempting a connection to the decoy agent's EDH via one of the decoy ports, each EDH having a dual function as an active resource in the network and as a decoy host simultaneously;

at least one trap server, to which a decoy agent proxies communication with the attacker, each trap server running services that interact with the attacker; and a forensic collector configured to collect, from the breached network host, forensics of the attacker's activity vis-à-vis the breached network host, when said decoy agent acts as a proxy between the attacker and a trap server and the trap server interacts with the attacker, the forensics comprising the processes run and the tools used by the attacker.

2. The system of claim 1, wherein said deception management server is configured to update the deception scheme in the network so as to reflect the released decoy port on the decoy agent's EDH.

3. The system of claim 1 wherein each decoy agent is implemented in software, and runs as a process on the operating system of the decoy agent's EDH.

4. The system of claim 1 wherein each decoy agent uses an inline component of the decoy agent's EDH that is able to monitor and divert incoming and outgoing communication.

5. A method for detecting malicious activity in an organization network that includes network hosts, endemic decoy hosts (EDHs) and trap servers, wherein an EDH is an actual resource in the network used to host a decoy agent, comprising:

storing, by a deception management server, deceptions within network hosts, each deception providing information that includes at least one decoy communication port of an EDH;

distributing, by the deception management server, decoy agents to EDHs, wherein each EDH has a first group of ports for communication applications, and a second group of ports, referred to as decoy ports, for connection by an attacker who has breached a network host using a deception stored in the breached network host, and wherein the decoy agents comprise active hardware or software components that run on the EDHs, listen to decoy ports, send alerts to the deception management server, and proxy communication to trap servers, each EDH having a dual function as an active resource in the network and as a decoy host simultaneously;

generating, by the deception management server, a deception scheme setting forth (i) which deceptions to store in which network hosts, (ii) for each decoy agent, which ports of the decoy agent's EDH to activate as decoy ports, and (iii) which trap server the decoy agent proxies communication to, when an attempt to communicate with the decoy agent's EDH via one of the decoy ports is identified, wherein a deception stored in a network host's web browser points to a deceptive web server, and wherein the trap server to which the decoy agent proxies communication with an attacker who follows the deception, is a web server hosting a deceptive website;

releasing, by each decoy agent, a decoy port when software on the decoy agent's EDH attempts to bind a port that is currently being used as a decoy port;

proxying, by each decoy agent, communication with the attacker through a trap server, in response to the decoy agent identifying an attempt by the attacker to connect to the EDH by one of the decoy ports, wherein the trap server runs services that interact with the attacker;

triggering, by the trap server, an alert to the deception management server when a decoy agent proxies communication between the attacker and the trap server; and collecting, from the breached network host, forensics of the attacker's activity vis-à-vis the breached network host, when the decoy agent acts as a proxy between the attacker and the trap server and the trap server interacts with the attacker, the forensics comprising the processes run and the tools used by the attacker.

6. The method of claim 5, wherein said deception management server updates the deception scheme in the network so as to reflect the released decoy port on the decoy agent's EDH.

7. The method of claim 5, wherein each decoy agent is configured to run in two modes; namely, a block mode and a proxy mode, wherein in block mode the decoy agent triggers an alert in response to the decoy agent identifying an attempt to communicate with the decoy agent's EDH via a decoy port, and wherein in proxy mode the decoy agent triggers an alert and also proxies communication to a trap server, in response to the decoy agent identifying an attempt to communicate with the decoy agent's EDH through a decoy port.

8. The method of claim 5 further comprising:

learning, by each decoy agent, which ports are being used by the decoy agent's EDH; and transmitting a list of the ports being used to the deception management server.

9. The method of claim 5 further comprising causing, by the deception management server, an EDH to uninstall a decoy agent that was previously installed in the EDH.

10. The method of claim 5, further comprising causing, by the deception management server, a network host to remove a deception that was previously stored in the network host.

* * * * *